Nov. 27, 1956  E. C. REDETZKE  2,771,831
SPRING-TRIP FOR CULTIVATOR SHOVELS
Filed Sept. 25, 1952  4 Sheets-Sheet 2
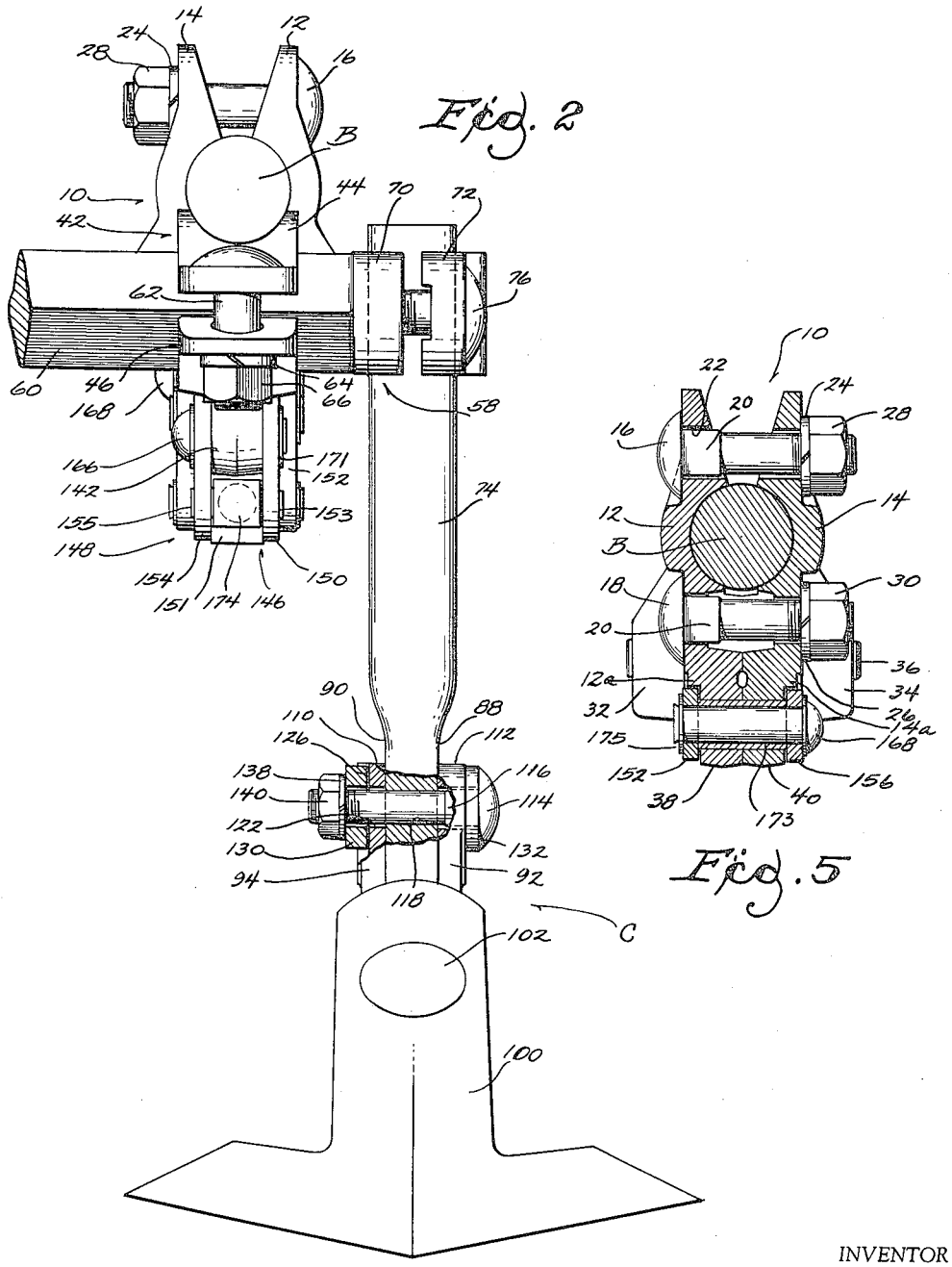
INVENTOR
EMERY C. REDETZKE
BY 
AGENT

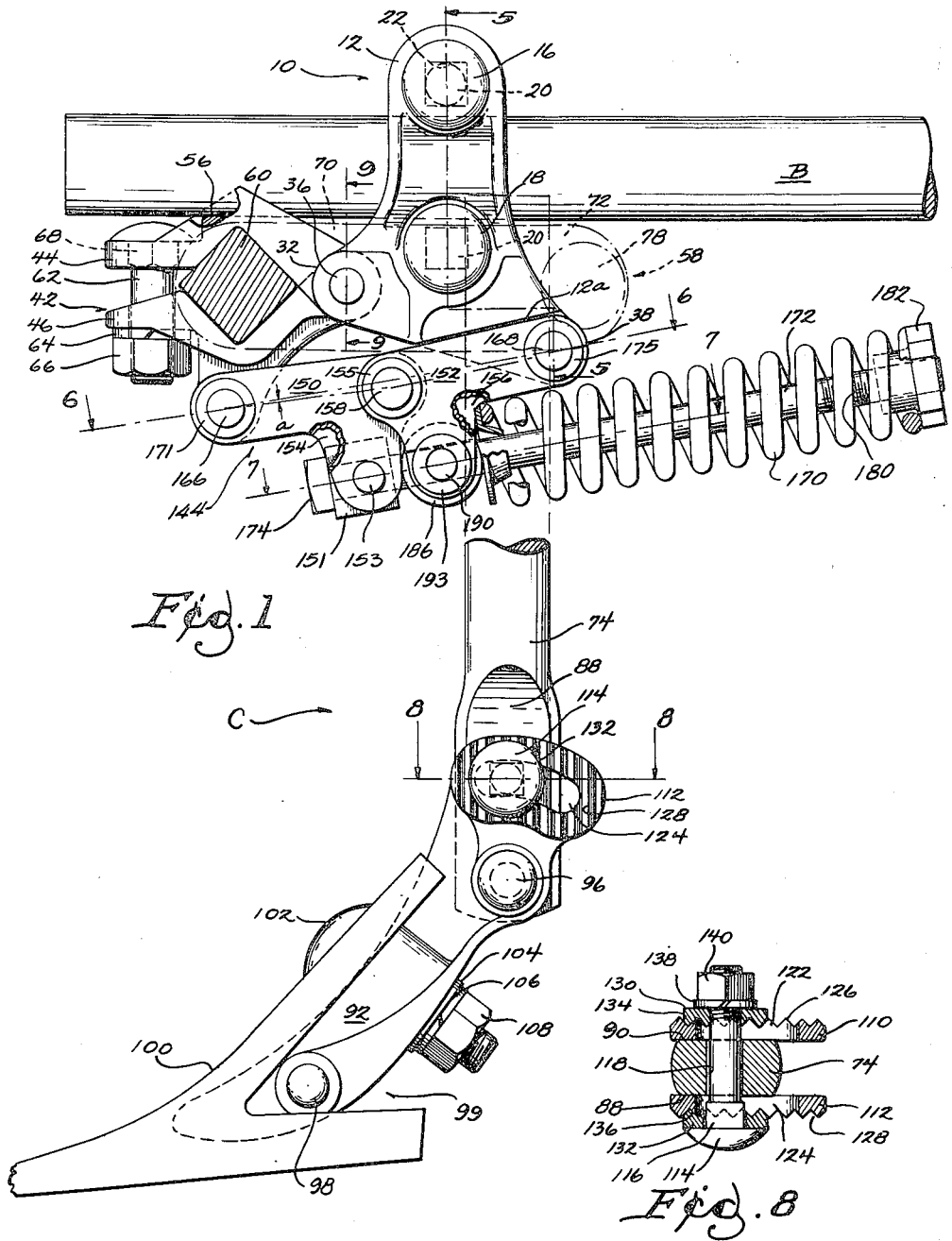

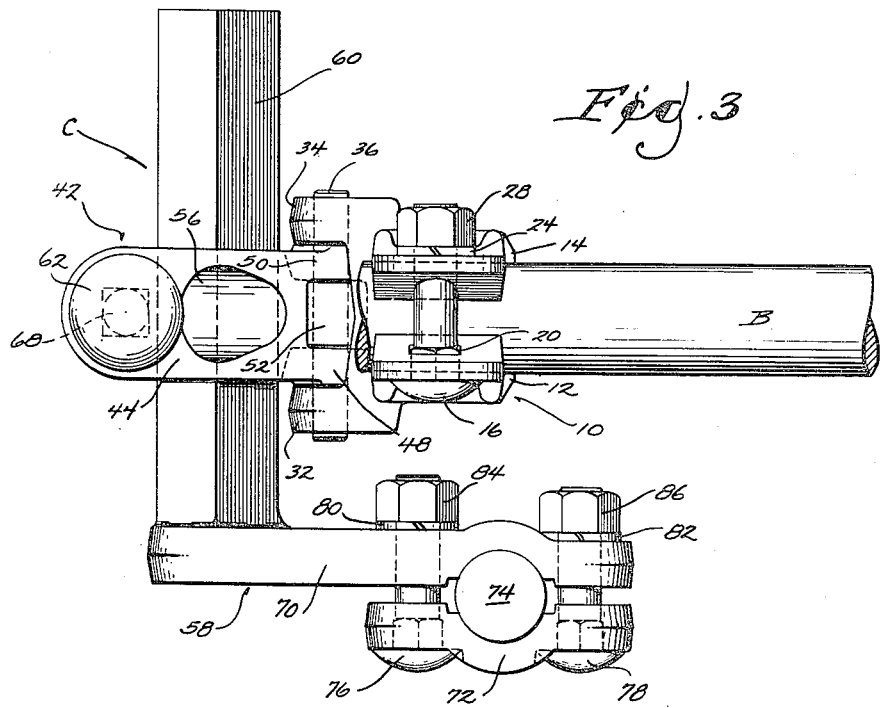
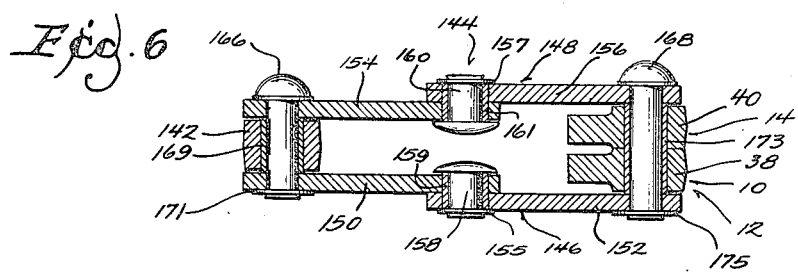
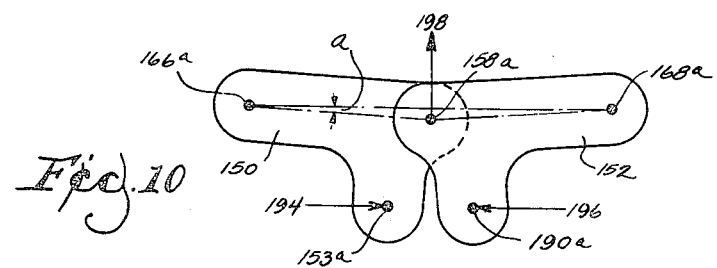
INVENTOR
EMERY C. REDETZKE

Nov. 27, 1956
E. C. REDETZKE
2,771,831
SPRING-TRIP FOR CULTIVATOR SHOVELS
Filed Sept. 25, 1952
4 Sheets-Sheet 4
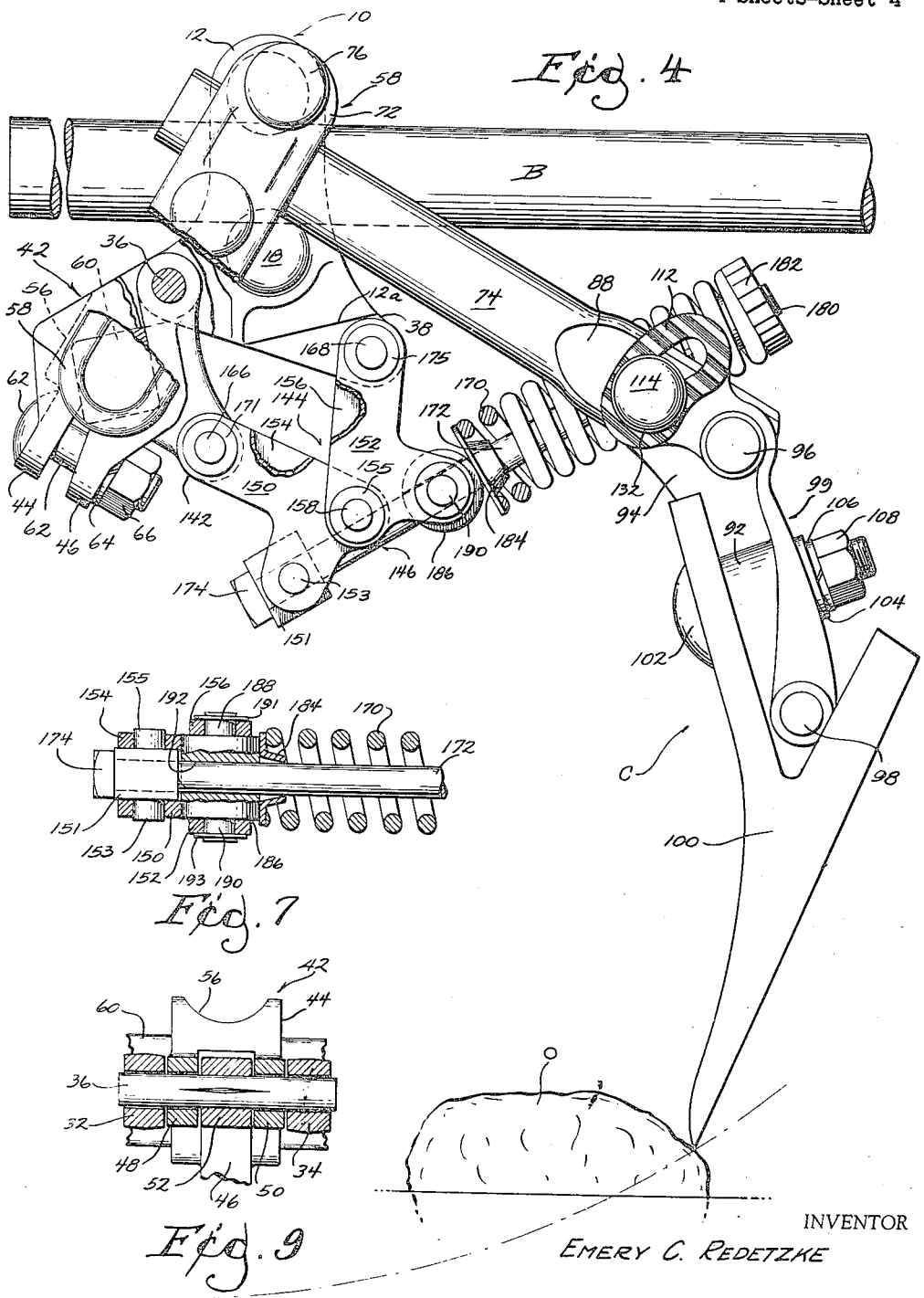
INVENTOR
EMERY C. REDETZKE
BY
AGENT

United States Patent Office 2,771,831
Patented Nov. 27, 1956

2,771,831

SPRING-TRIP FOR CULTIVATOR SHOVELS

Emery C. Redetzke, Moline, Ill., assignor to J. I. Case Company, Racine, Wis., a corporation of Wisconsin Application September 25, 1952, Serial No. 311,405

5 Claims. (Cl. 97—47.88)

This invention relates to cultivator shovels and especially to the type provided with a resilient mounting capable of yielding rearwardly when the shovel strikes an obstruction, and thus prevent injury to the shovel and its mounting.

An object of this invention is to provide a spring-trip shovel mounting which will yield rearwardly when the shovel encounters an obstruction and which will return the shovel to the operating position when the obstruction has been passed.

Another object is to provide a spring-trip shovel mounting which will allow the shovel to clear high obstructions when tripped rearwardly.

Another object is to provide a spring-trip shovel mounting which has a uniform resistance to yielding, when encountering an obstruction.

Another object is to provide a positive stop for the operating position of the shovel.

Another object is to locate the spring-trip mechanism at a point above the shovel so that it will not encounter dirt or other material that will clog the mechanism or damage it.

Another object is to provide a shovel spring-trip mounting which has a reduced tendency to force the shovel deeper in the soil when yielding rearwardly.

Another object is to provide a shovel shoe that is secured to the shank after the initial adjustment has been made and which adjustment cannot be easily disturbed.

Another object is to provide a cultivator shovel which can be shifted laterally while being mounted on a fore-and-aft cultivator beam.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

Referring to the drawings, Fig. 1 is an elevational side view with parts removed showing the preferred form of the invention.

Fig. 2 is a front view of the arrangement shown in Fig. 1.

Fig. 3 is a plan view of the invention with parts removed or broken away.

Fig. 4 is an elevational side view showing the shovel in tripped position and in contact with an obstruction.

Fig. 5 is a section taken at 5—5 of Fig. 1;
Fig. 6 is a section taken at 6—6 of Fig. 1;
Fig. 7 is a section taken at 7—7 of Fig. 1;
Fig. 8 is a section taken at 8—8 of Fig. 1;
Fig. 9 is a section taken at 9—9 of Fig. 1; and
Fig. 10 is a diagrammatic view of the toggle link.

A cultivator beam B secured to a tractor or other means of transport supports the cultivator shoe assembly C as shown in Figs. 1 to 4, inclusive. The means of attaching the beam B to the transport means is conventional and not a part of the invention: It will, therefore, not be further described.

Fig. 1 shows the cultivator shoe assembly C in operating position, and which is secured to beam B by a clamp 10. Clamp 10 comprises a portion 12 and a portion 14. Portions 12 and 14 are forgings in this instance and are positioned on opposite sides of beam B, as shown in Figs. 2, 3, and 5.

A pair of carriage bolts 16 and 18 pass through suitable holes in portions 12 and 14, bolts 16 and 18 being provided with square portions such as 20 of Fig. 3 which square portions conform to square openings in portion 14 and 16 as indicated at 22 of Fig. 1. The purpose of the square portions on the bolts 16 and 18 and that on others hereafter mentioned is to prevent the bolts from rotating when the nuts are tightened.

The purpose of clamp 10 is to support the cultivator shovel on beam B, and also to provide the means of pivoting the various members about to be described.

Lockwashers 24 and 26, and nuts 28 and 30 are assembled on bolts 16 and 18 and serve to hold clamp 10 securely in place on beam B against forces tending to rotate it relative to the latter.

Portions 12 and 14 are each provided with a boss 32 and 34 respectively which have co-axial holes therethrough for the reception of a pin 36. Pin 36 is of the commercial type called a "Groove Pin" or any suitable type that can be driven in place and not become displaced. The purpose of pin 36 is to serve as a journal pin about which the shoe assembly C rotates when the latter encounters an obstruction such as at O of Fig. 4. A second pair of bosses 38—40 are formed as part of portions 12 and 14 respectively. The function of these bosses will be later described.

A pivot clamp 42 forms the primary connection between the cultivator shoe assembly C and the beam B. Clamp 42 comprises an upper portion 44 and a lower portion 46. Upper portion 44 is provided with a pair of bosses 48 and 50, and the lower portion has a boss 52 located intermediate bosses 48 and 50. The pivot pin 36 passes freely through suitable holes in bosses 32, 34, 48, and 50, thereby providing a pivot for clamp 42 relative to clamp 10. Pin 36 is a force-fit in the hole in boss 52 in order to prevent the pin from moving axially. Upper portion 44 of clamp 42 is provided with a circular depression 56 which provides abutment for beam B when the cultivator shovel is in operating position.

An extension arm 58 cooperates with clamp 42 to support the cultivator shovel C. Extension arm 58 comprises a square shank 60 of a length sufficient to allow cultivator shovel C to be adjusted transversely to the beam B. Shank 60 is positioned with its edges vertical and horizontal in order to take advantage of the maximum strength in vertical and horizontal directions. Upper and lower portions 44 and 46 of clamp 42 have seats conforming to shank 60 in order to hold the latter securely against rotating and twisting. A carriage bolt 62 is passed through portions 44 and 46 and a lockwasher 64 and nut 66 secure the shank 60 in the clamp 42. Bolt 62 is provided with a square portion 68 which cooperates with a square hole in upper portion 44 to prevent bolt 62 from turning when nut 66 is tightened.

Shank 60 has formed as a part thereof a rearwardly-extending arm 70 the extremity of which forms one-half of a clamp as shown in Figure 3. A complementary clamp cap 72 is positioned in opposed relation to arm 70 and cooperates with the latter to hold the cultivator shovel in operating position.

Shovel C in this instance has a round shank 74 positioned generally vertically. Arm 70 and cap 72 are provided with cylindrical seats which conform to shank 74 and a pair of carriage bolts 76 and 78 provide means to clamp shank 74 between arm 70 and cap 72 in the manner shown in Fig. 3. Lockwashers 80 and 82 and nuts 84 and 86 complete the clamp means to hold the cultivator shovel C in rigid relation with the shank 60.

It will be seen that when shovel C encounters an obstruction the shovel will move rearwardly in an arc having as its center the axis of pin 36.

The lower end of shank 74 is flattened as at 88 and 90 to provide a proper bearing surface for shovel shoe portions 92 and 94. Portions 92 and 94, in this instance, are alike with the exception that one is right-handed and the other left-handed, and they are placed one on each side of the flattened portion of shank 74. A rivet 96 is passed through portion 92, shank 74, and portion 94 and riveted so as to secure portions 92 and 94 in adjustable relation on shank 74. A second rivet 98 secures the lower ends of portions 92 and 94 together to form an integral shoe unit 99. In this instance a sweep shovel 100 is secured to shoe unit 99 by a bolt 102 which passes between portions 92 and 94. A plain washer 104, a lockwasher 106, and a nut 108 secure the shovel 100 to shoe unit 99. Shovel 100 and its mounting will not be further described as these details are conventional.

Shoe portions 92 and 94 have extensions 110 and 112 at their upper ends to provide angular adjustment of shovel 100 relative to the shank 74. This means of adjustment must be positive and not liable to be disturbed by contact with stones or other obstructions. The means of adjustment comprises providing a bolt 114 having a square portion 116 adjacent its head to prevent turning. Bolt 114 is passed through a hole 118 in shank 74 which hole is a snug fit for the shank of the bolt.

Extensions 110 and 112 are shaped as in Fig. 1 in which only extension 112 is shown and which description will suffice for both extensions, one being located on either side of shank 74. Slots 122 and 124 are provided, which have as their center of arc the axis of rivet 96, which slots are of a width to allow sufficient clearance around the square portion 116 of bolt 114. Extensions 110 and 112 are fluted as indicated at 126 and 128 of Figs. 1 and 8.

A pair of washers 130 and 132 are assembled on bolt 114 as shown in Figs. 1, 2, and 8. Washers 130 and 132 have flutes 134 and 136 respectively which are complementary to flutes 126 and 128 respectively. A lockwasher 138 and nut 140 complete the means of securing the shovel 100 and shank 74 in adjusted relation.

The spring trip mechanism will now be described. This mechanism is shown in the normal position in Fig. 1, and Fig. 4 shows the position of the mechanism after having encountered an obstruction O. The spring-trip mechanism S is of the "toggle joint" type employing resilient means to provide the force of resistance. A boss 142 is formed as an integral part of lower portion 46 of clamp 42. A toggle joint assembly 144 is pivoted about the common axis of bosses 38 and 40, and the axis of boss 142, which axes are parallel.

Toggle joint assembly 144 comprises a pair of link assemblies 146 and 148. Link assembly 146 comprises a pair of links 150 and 152 and link assembly 148 comprises a pair of links 154 and 156.

Links 150 to 156 are similar in contour as shown in Fig. 1 and are provided with pivot rivets 158 and 160. Rivets 158 and 160 are inserted in bushings 159 and 161 which are of a length in excess of the combined thickness of links 148 and 154, and of the combined thickness of links 150 and 152, so that the links are free to rotate relative to rivets 158 and 160. Washers 155 and 157 are placed on rivets 158 and 160 before the latter are riveted in place. Link assemblies 146 and 158 are pivoted about rivets 166 and 168. A bushing 169 is provided of a length slightly in excess of the width of boss 142 so that when rivet 166 is riveted, the links 150 and 154 will be free to rotate about boss 142. A washer 171 is assembled on rivet 166 before the latter is riveted. A bushing 173 is provided which is of a length slightly in excess of the combined length of bosses 38 and 40 so that when rivet 168 is riveted links 152 and 156 will be free to rotate about bosses 38 and 40. A washer 175 is assembled on rivet 168 before the latter is riveted. Links 150, 152, 154, and 156 are L shaped as shown in Figs. 1 and 4, for reasons which will appear.

In order to provide the necessary resistance against a yielding of the shovel in a rearward direction, it has been found that a compression coil spring 170 in conjunction with toggle joint assembly 144, is satisfactory and provides a uniform resistance. The manner of employing spring 170 for this purpose will now be described. A bolt 172 having a head 174 is passed through spring 170 as shown in Figs. 1, 4, and 7. Bolt 172 is passed through a trunnion block 151 having trunnions 153 and 155. Trunnions 153 and 155 are offset relative to a line passing through the axes of rivets 166 and 168. Bolt 172 extends beyond the end of spring 170 and is provided with a thread at 180. A nut 182 having a polygonal head is fitted on threaded portion 180 and abuts the end of spring 170. The function of nut 182 will be made clear later in the description.

A spring guide washer 184 abuts the other end of spring 170 and assures that the latter remains generally central on bolt 172.

A pivot block 186, of cylindrical shape in this instance, is pivoted between links 152 and 156 on trunnions 188 and 190 in corresponding holes in links 152 and 156.

Trunnions 188 and 190 have axes offset relative to a line passing through the axes of rivets 166 and 168. A line passing through the axes of trunnions 153 and 190 is substantially parallel to a line passing through the axes of rivets 166 and 168.

Washers 191 and 193 are placed on trunnions 188 and 190 before the latter are riveted. A hole 192 is provided in block 186 which is a free fit for the shank of bolt 172, so that the latter may slide therein as shown in Fig. 4.

Spring guide washer 184 rests against pivot block 186, and spring 170 is held between washer 184 and nut 182. Nut 182 is tightened until the desired resistance is obtained to keep the shovel in the soil under normal conditions.

The normal position of the components of the spring-trip mechanism is shown in Fig. 1. Portions 12 and 14 of clamp 10 are provided with abutments 12a and 14a, respectively, as shown in Figs. 1 and 5. These abutments cooperate with links 152 and 156 at the upper edges of the latter in order to maintain angle $a$ as indicated in Figs. 1 and 10. Angle $a$ is critical and must be sufficient to position the axis of rivet 158 below the line passing through the axes of rivets 166 and 168. This is necessary in order to provide a resultant component tending to increase angle $a$. If angle $a$ were to approach zero, the resultant would approach zero and the toggle assembly would not allow the shoe to "break back."

A diagrammatic view such as Fig. 10 serves best to explain the function of the toggle joint assembly. In this view, points 158a, 166a, 168a, 153a, and 190a, correspond to the axes of members 158, 166, 168, 153, and 190. The equal and opposed forces 194 and 196 are those applied by the energy stored in spring 170 and tend to rotate link 150 counterclockwise about point 166a, and link 152 clockwise about point 168a. The resultant force 198 is that which must be overcome in order to allow the shovel 100 to pivot about pivot pin 36 when an obstruction is encountered. The force necessary to overcome force 198 is greatest when the links are in the position shown with the angle $a$ at the minimum, and which force is applied when the shovel 100 strikes an obstacle and is resisted by spring 170. Therefore, the resistance offered to obstacles by the shovel is controlled by the energy stored in spring 170 and which resistance can be adjusted by means of adjusting nut 182.

When shovel 100 has encountered an obstacle and pivots about pin 36 as shown in Fig. 4, angle $a$ will increase, thus diminishing the force necessary to continue the rearward swinging of shoe 100.

When the obstacle has been passed and no force tends to hold shoe 100 in the rearward position, the force of spring 170 will again return the shovel to the operating position which has been reached when links 152 and 156 contact abutments 12a and 14a, respectively, as shown in Figs. 1 and 5.

The above being a complete description of an illustrative embodiment of the invention, what is claimed as new and desired to be secured by Letters Patent of the United States is:

1. A cultivator for mounting on a fore-and-aft bar, comprising a bar clamp having forward and rearward transverse pivot portions depending therefrom, a substantially vertical shank offset tranversely from said bar and rearwardly of said forward pivot portion, and having a shoe at the lower extremity thereof, means to permit rearward swinging of said shoe on encountering an obstacle, comprising a transverse extension arm secured to the upper extremity of said vertical shank, a pivot clamp secured to said arm and pivoted in said forward pivot portion and having a depending pivot bracket forwardly of said forward transverse pivot, a toggle linkage comprising fore-and-aft links having a mutual pivot at their midpoints, the front and rear extremities of said linkage pivoted to said depending pivot bracket and said rearward pivot portion respectively, said linkage having resilient means cooperating therewith to resist said rearward swinging of said shoe, and said bar clamp provided with an abutment means for said links to establish the operating position of said shoe.

2. A cultivator for mounting on a fore-and-aft bar, comprising a bar clamp having forward and rearward transverse pivot portions depending therefrom, a shank offset transversely from said bar and disposed rearwardly of said forward pivot portion, and having a shoe at the lower extremity thereof, means to allow rearward swinging of said shoe on encountering an obstacle, comprising a transverse extension arm secured to said vertical shank, a pivot clamp secured to said arm and pivoted in said forward pivot portion, and having a depending pivot bracket forwardly of said forward transverse pivot, a toggle linkage comprising fore-and-aft links having a mutual pivot at their midpoints, the front and rear extremities of said linkage pivoted to said depending pivot bracket and said rearward pivot portion respectively, said linkage having resilient means to resist said rearward swinging of said shoe.

3. A cultivator for mounting on a fore-and-aft bar, comprising a bar clamp having forward and rearward transverse pivot portions depending therefrom, a vertical shank offset transversely from said bar and rearwardly relative to said forward pivot portion, and having a shoe at the lower extremity thereof, means to allow rearward swinging of said shoe on encountering an obstacle, comprising a transverse extension arm secured at the upper extremity of said vertical shank, a pivot clamp secured to said arm and pivoted in said forward pivot portion, and having a depending pivot bracket, a toggle linkage comprising fore-and-aft links, the front and rear extremities of said linkage pivoted to said depending pivot bracket and said rearward pivot portion respectively, and resilient means to resist said rearward swinging of said shoe.

4. A cultivator for mounting on a bar, comprising a bar clamp having forward and rearward transverse pivot portions depending therefrom, a shank having a shoe at one extremity thereof said shank spaced rearwardly of said forward pivot portion, means to allow rearward swinging of said shoe on encountering an obstacle, comprising a forwardly extending arm secured to the other end of said shank and having a transverse portion, a pivot clamp secured to said transverse portion and pivoted in said forward pivot portion, and having a pivot bracket, a toggle linkage comprising fore-and-aft links having a mutual pivot at their midpoints, said linkage pivoted at the front and rear extremities thereof to said depending pivot bracket and said rearward pivot portion respectively, and resilient means to resist said rearward swinging of said shoe.

5. A cultivator for mounting on a bar, comprising a clamp having a forward and a rearward transverse pivot portion, a shank having the axis thereof offset transversely of said bar and rearwardly of said forward pivot portion, a pressure release means comprising a fore-and-aft arm clamped to said shank and having a transverse rectangular portion forwardly of said forward transverse pivot portion, a pivot clamp secured to said rectangular portion and pivoted in said forward pivot portion, said pivot clamp having a pivot bracket, and a toggle linkage pivoted at the extremities thereof to said pivot bracket and said rearward pivot portion.

References Cited in the file of this patent

FOREIGN PATENTS

| | | |
|---|---|---|
| 504,406 | Traphagen | Sept. 5, 1893 |
| 581,968 | Traphagen | May 4, 1897 |
| 642,510 | Tuttle et al. | Jan. 30, 1900 |
| 789,305 | Waterman | May 9, 1905 |
| 848,115 | Merrill | Mar. 26, 1907 |
| 1,734,408 | Thompson | Nov. 5, 1929 |
| 1,865,651 | Traphagen | July 5, 1932 |